United States Patent [19]

Wiggin

[11] 4,101,932
[45] Jul. 18, 1978

[54] VIDEO PREAMPLIFIER FOR CAMERA OPERATED IN ACT MODE

[75] Inventor: Joseph F. Wiggin, Quincy, Ill.

[73] Assignee: Harris Corporation, Cleveland, Ohio

[21] Appl. No.: 839,980

[22] Filed: Oct. 6, 1977

Related U.S. Application Data

[63] Continuation of Ser. No. 632,245, Nov. 17, 1975, abandoned.

[51] Int. Cl.² .............................................. H04N 5/14
[52] U.S. Cl. ..................................... 358/223; 358/184
[58] Field of Search ................................ 358/223, 184

[56] References Cited

U.S. PATENT DOCUMENTS

| | | | |
|---|---|---|---|
| 3,182,122 | 5/1965 | Kao | 178/7.3 |
| 3,238,295 | 3/1966 | Menl et al. | 178/7.2 |
| 3,341,655 | 9/1967 | Vilkomerson | 178/7.2 |
| 3,700,794 | 10/1972 | Loose | 178/7.1 |
| 3,764,738 | 10/1973 | Zettl et al. | 178/7.2 |
| 3,927,255 | 12/1975 | Yorkanis | 178/7.3 |

FOREIGN PATENT DOCUMENTS

| | | | |
|---|---|---|---|
| 1,191,096 | 1969 | United Kingdom | 178/DIG. 26 |

Primary Examiner—John C. Martin

[57] ABSTRACT

A video preamplifier for use in television cameras which have imaging tubes operated in an ACT mode. Circuitry is provided for sensing and amplifying the video signal without substantial interference from the large white pulses which are inherently part of the video signal of ACT operated imaging tubes. Two or more amplification stages are included with a clipping circuit interposed between them. The clipping circuit works only on relatively large signals and thus discriminately blocks the major portion of the white pulse while passing the remainder of the video signal without disturbance. Overloading problems in later amplification stages are thus substantially avoided.

5 Claims, 1 Drawing Figure

VIDEO PREAMPLIFIER FOR CAMERA OPERATED IN ACT MODE

This is a continuation of application Ser. No. 632,245 filed Nov. 17, 1975 now abandoned.

The present invention relates to the art of amplification of video signals from television imaging tubes and more particularly to video preamplifiers for ACT operated vidicon tubes.

The use and operation of vidicon tubes as imaging transducers in television cameras is well known in the art. See, for example, Reference Data for Radio Engineers, fifth edition, 1968, page 16–46. Various problems, however, have been recognized in their use. A major problem preventing their successful utilization was failure of the scanning beam to fully discharge areas of the target representing highlights of the image. This resulted in a persistence of image on the target which in turn leads to comet-like tails following moving highlight areas of the subsequently displayed image. This problem was in large part solved by tremendously increasing the intensity of the scanning beam during retrace. This mode of operation has become known in the art as "anti-comet-tail" operation, or ACT operation.

While solving the transducer problem, ACT operation has led to other problems in the sensing of the video signal. The high intensity of the retrace beam produces a large "white pulse" at the video output electrode during each retrace interval. The white pulses are considerably stronger than the image signal and have a tendency to significantly degrade the response of video preamplifiers by severely overdriving them. The degradation results from the finite time required by the preamplifiers to recover from saturation after each white pulse. During this recovery period the image signal may be distorted or lost altogether.

This problem has been recognized in the art and various solution devised to resolve it. Thus U.S. Pat. No. 3,764,738 discloses the use of a variable impedance to shunt the output of the imaging tube. This impedance is triggered to a low-resistance mode during each white pulse, thus shorting a major portion of the pulse to ground. A difficulty with this approach is that the connection of additional components to the output of the imaging tube results in a decreased input impedance and commensurate diminution of frequency response and signal-to-noise ratio.

Another approach is to decrease the sensitivity of the imaging tube during retrace by varying the target to cathode potential. This method is of limited application, however, because some tubes, for example those of the plumbicon variety, are not subject to this type of control.

Accordingly, it is a primary object of the present invention to provide apparatus for the initial amplification of a video signal derived from an ACT operated imaging tube, without loss or deterioration of the image signal.

It is a further object of the present invention to provide apparatus for such amplification which retains a wide frequency response and high signal to noise ratio.

In accordance with the present invention, apparatus is provided for the improved preamplification of a video signal from an imaging tube operated in an ACT mode. This improved apparatus is comprised of at least first and second amplification stages with a clipping circuit interposed between them. The clipping circuit operates to clip the white pulses at a fixed voltage level while leaving the remainder of the video signal undisturbed. This entails no further connections with the output of the imaging tube; therefore high input impendance and all the advantages appurtenant thereto are retained.

DESCRIPTION OF THE PREFERRED EMBODIMENT

Figure 1:
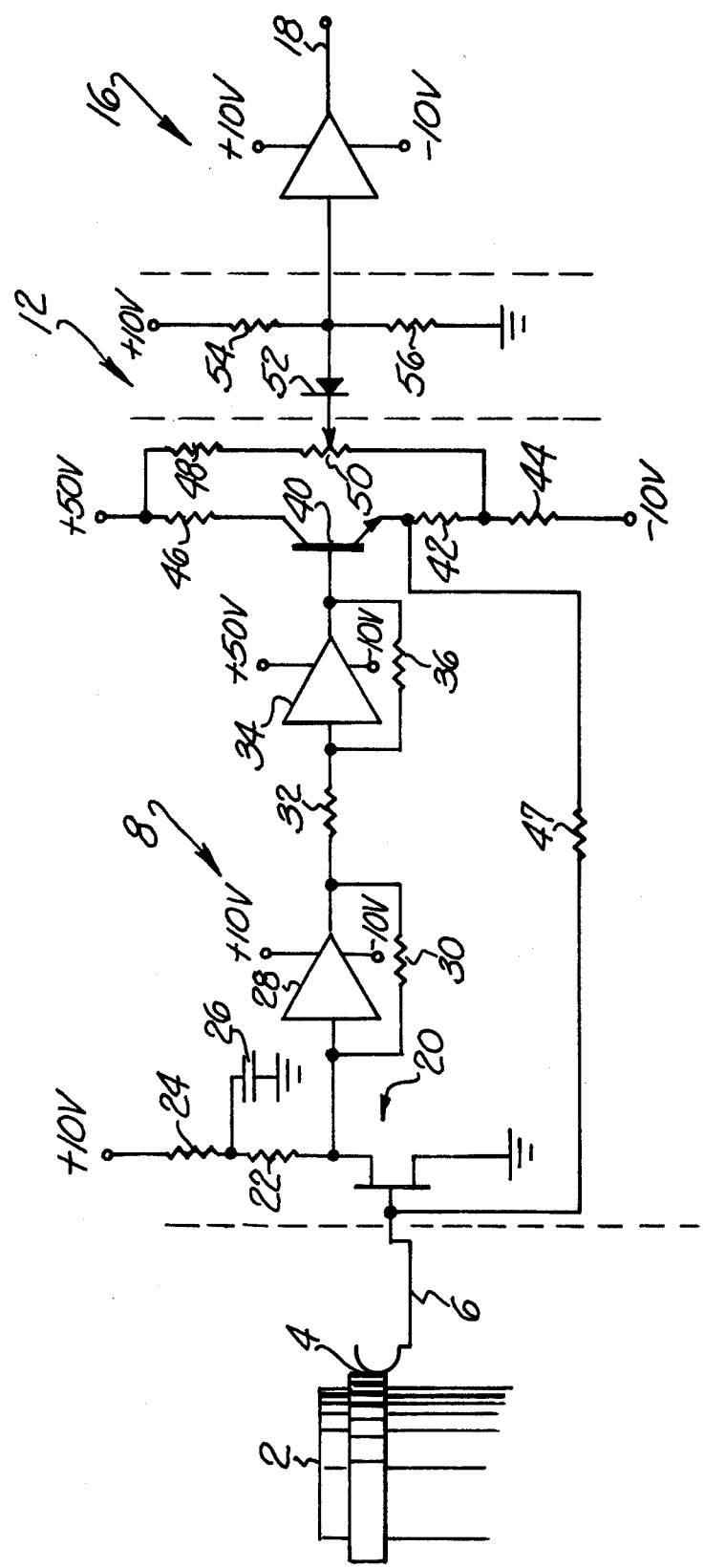

The foregoing and other objects and advantages of the invention will become more readily apparent from the following description of the preferred embodiment of the invention, as taken in conjunction with the accompanying drawing which is a part hereof and wherein:

FIG. 1 is a schematic illustration of one embodiment of the invention.

Referring now to the drawing, an ACT operated imaging tube 2 has a video output electrode 4 to which the input 6 of the preamplifier is connected. The preamplifier is comprised generally of three series connected stages, identified generally as first amplifier 8, clipping circuit 12, and second amplifier 16. The output of the preamplifier is taken from the output 18 of second amplifier 16.

Referring specifically to first amplifier 8, preamplifier input 6 is connected to the gate of field effect transistor 20, used herein because of its high input impedance. The source of field effect transistor 20 is connected to ground potential, and its drain is connected to a +10 volt supply through series connected load resistors 22 and 24. Capacitor 26 is connected from the junction of load resistors 22 and 24 to ground potential for decoupling purposes. The drain of transistor 20 is also connected to the input of amplifier 28. Amplifier 28 is operated from +10 volt and −10 volt supplies and is stabilized by shunt feedback resistor 30. The amplified signal then passes from the output of amplifier 28, through resistor 32 to the input of amplifier 34. To prevent overloading of this stage due to the large white pulses in the video signal, amplifier 34 is operated from +50 volt and −10 volt power supplies. Stabilization is accomplished with shunt feedback resistor 36. The output of amplifier 34 is coupled to an emitter follower circuit comprised of NPN transistor 40, series connected emitter resistor 42 and 44, and a resistor 46. The collector of transistor 40 is connected to the +50 volt sypply through resistor 46, and the emitter is connected to the −10 volt supply through emitter resistors 42 and 44. First amplifier stage 8 is further stabilized by shunt feedback resistor 47 connected between the gate of field effect transistor 20 and emitter resistor 42. The +50 volt supply is also connected to the junction of emitter resistors 42 and 44 through series connected dropping resistor 48 and potentiometer 50. The output of first amplifier stage 8 is taken from the wiper arm of potentiometer 50. The emitter follower stage, which adds no amplification to the signal, is included to provide good output characteristics for the first amplifier stage 8. Thus clipper stage 12 sees a low impedance, high current drive voltage source at its input.

Clipper stage 12 is comprised of a diode 52 and its biasing resistors 54 and 56. Biasing resistors 54 and 56 are series connected between a +10 volt supply and ground potential. The anode of diode 52 is attached to the junction of the biasing resistors, and the cathode is connected to the wiper arm of potentiometer 50. Circuit components are scaled so that biasing current flows through diode 52 back into the output of first amplifier 8, such amplifier acting as a current sink. As long as diode 52 is thus forward biased, the voltage at the junction of biasing resistors 54 and 56 follows the output voltage of first amplifier stage 8. As this output voltage increases, however, the current through diode 52 decreases, eventually reaching zero when the output voltage rises to a level fixed by the ratio of resistor 54 to 56. Above this fixed voltage level, diode 52 is reverse biased and the excess voltage blocked. Since there is only the very small diode capacitance associated with clipping circuit 12, it returns to the conductive state immediately upon the reduction of the output voltage of first amplifier 8. Potentiometer 50 controls the magnitude of the signal voltage seen by clipping circuit 12. Thus, when potentiometer 50 is properly adjusted, clipping circuit 12 operates to freely pass the image signal but blocks the bulk of the large positive white pulse.

With the disruptive white pulses so removed, the signal can be further amplified to levels where it can be acted upon by subsequent signal processing equipment. Thus the output of clipping circuit 12, taken from the junction of biasing resistors 54 and 56, is connected to second amplifier 16. There the video signal is further amplified and outputted from the preamplifier on output line 18.

Although the invention has been described in conjunction with a preferred embodiment it is to be appreciated that various modifications and arrangements of parts maybe made without departing from the spirit and scope of the invention as defined by the appended claims.

Having thus described my invention, I claim:

1. An improved video preamplifier for use in a television camera having an imaging tube operated in an ACT mode for producing a video signal having large signal, unsuppressed white pulses interspersed periodically thereon due to said ACT operation, said imaging tube having a video output circuit, said improved video preamplifier comprising:

first amplifier means serially connected to said video output circuit for providing first amplification of said video signal, including said unsuppressed white pulses, without being overdriven thereby;

second amplifier means serially connected to said first amplifier means for second amplification of said video signal; and, clipping circuit means interposed between said first amplifier means and said second amplifier means for clipping said large signal white pulses to prevent overdriving of said second amplifier means.

2. An improved video preamplifier as set forth in claim 1 wherein said clipping circuit means comprises biasing means for establishing a fixed clipping voltage, and semiconductor means responsive to said biasing means for clipping said video signal at said fixed clipping voltage.

3. An improved video preamplifier as set forth in claim 2 wherein said semiconductor means comprises a diode having an anode and a cathode, said anode being connected to the input of said second amplifier means together with said biasing means, and said cathode being connected to the output of said first amplifier means whereby said diode is normally forward biased by said biasing means but becomes reverse biased when the output signal of said first amplifier means rises above said clipping voltage.

4. An improved video preamplifier as set forth in claim 1 wherein said first amplifier means has a very high input resistance and low input capacitance whereby the signal-to-noise ratio and frequency response of said improved video preamplifier are maximized.

5. An improved video preamplifier as set forth in claim 3 wherein said biasing means comprises a resistive voltage divider having two resistors connected in series between ground potential and a fixed voltage, with the junction of said two resistors being connected to said anode of said diode and also to the input of said second amplifier means.

* * * * *